(12) United States Patent
Solow

(10) Patent No.: US 8,307,285 B2
(45) Date of Patent: Nov. 6, 2012

(54) METHOD AND SYSTEM HAVING A MULTI-FUNCTION BASE FOR STORING AND ACCESSING AN AUDIO FILE FOR USE IN SELECTION OF A HORN

(75) Inventor: Stanley Solow, Plainview, NY (US)

(73) Assignee: Wolo Mfg. Corp., Deer Park, NY (US)

( * ) Notice: Subject to any disclaimer, the term of this patent is extended or adjusted under 35 U.S.C. 154(b) by 569 days.

(21) Appl. No.: 12/633,222

(22) Filed: Dec. 8, 2009

(65) Prior Publication Data

US 2010/0146391 A1 Jun. 10, 2010

Related U.S. Application Data

(60) Provisional application No. 61/120,623, filed on Dec. 8, 2008.

(51) Int. Cl.
*G10H 7/00* (2006.01)
(52) U.S. Cl. .......................................... 715/716; 84/609
(58) Field of Classification Search .......... 715/716–718, 715/727, 745, 719–726, 771–772; 360/5; 711/111; 345/162–168, 179; 84/645, 454, 84/462, 742; 700/94; 381/98, 118, 119, 381/123; 455/567
See application file for complete search history.

(56) References Cited

U.S. PATENT DOCUMENTS

| | | | | |
|---|---|---|---|---|
| 5,552,569 | A * | 9/1996 | Sapkowski | 181/199 |
| 5,848,166 | A * | 12/1998 | Fisher et al. | 381/62 |
| 7,099,848 | B1 * | 8/2006 | Bratton | 705/57 |
| 7,106,309 | B2 * | 9/2006 | Wood et al. | 345/173 |
| 7,332,669 | B2 * | 2/2008 | Shadd | 84/742 |
| 7,394,012 | B2 * | 7/2008 | Schultz | 84/615 |
| 8,030,871 | B1 * | 10/2011 | Young et al. | 318/461 |
| 2002/0089416 | A1 * | 7/2002 | Dornfeld | 340/384.4 |
| 2003/0054867 | A1 * | 3/2003 | Dowlat et al. | 455/567 |
| 2005/0271156 | A1 * | 12/2005 | Nakano | 375/265 |
| 2006/0293089 | A1 * | 12/2006 | Herberger et al. | 455/567 |
| 2007/0234880 | A1 * | 10/2007 | Adams et al. | 84/601 |
| 2008/0047415 | A1 * | 2/2008 | Schultz | 84/723 |
| 2008/0053293 | A1 * | 3/2008 | Georges et al. | 84/609 |
| 2008/0091932 | A1 * | 4/2008 | Mcnutt et al. | 713/1 |
| 2008/0156178 | A1 * | 7/2008 | Georges et al. | 84/645 |
| 2010/0132536 | A1 * | 6/2010 | O'Dwyer | 84/609 |

* cited by examiner

*Primary Examiner* — Steven Sax
(74) *Attorney, Agent, or Firm* — Andrew F. Young, Esq.; Lackenbach Siegel, LLP

(57) ABSTRACT

The present invention comprises recording an audio file that is representative of a particular horn. Each audio file is stored in a memory that can be integrated within a single device together with a keypad, a display, a power source, and/or a data port. The device is accessed by the system user through a keypad. A display indicates to the user a set of choices from among the different audio files that can be accessed, and the user makes a choice. Entering of a request command to play the selected audio file causes the file to be played through one or more speakers, head phones, or store audio system. The system can also be linked to a printer that can print a receipt or a ticket corresponding to the selected horn type. The device can comprise a volume control; and, power to the system can be supplied by battery, AC, or both. The system, whether embodied in a single device, in separate stand-alone devices, or as part of a system having a remote hub, can include a USB port for receiving of updated programs or digital data to supplement or complement software routines within the system.

7 Claims, 10 Drawing Sheets

FRONT VIEW

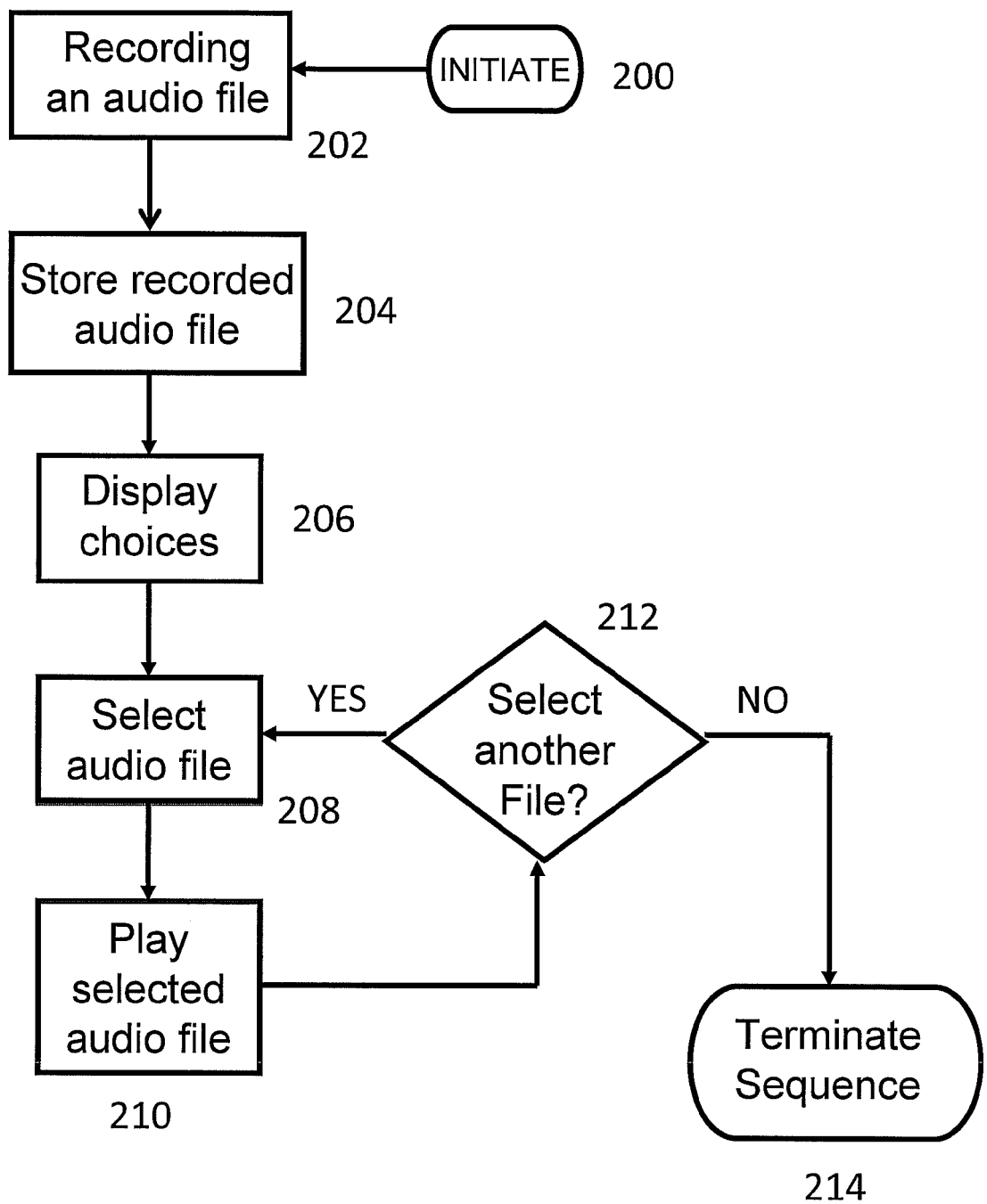

US 8,307,285 B2

METHOD AND SYSTEM HAVING A MULTI-FUNCTION BASE FOR STORING AND ACCESSING AN AUDIO FILE FOR USE IN SELECTION OF A HORN

CROSS REFERENCE TO RELATED APPLICATIONS

This application refers to U.S. Patent Application Ser. No. 61/120,623, filed Dec. 8, 2008; the entire contents of which is herein incorporated fully by reference.

BACKGROUND OF THE INVENTION

1. Field of the Invention

The present invention relates to a method and system for sampling and selecting audio files associated with a corresponding horn system. More specifically, the present invention relates to a system, and its corresponding method, for storing an audio file representing the sound output of a particular horn. Different audio files representing different horn types are stored in a memory and accessed by a system user who wishes to select a particular horn type without having to sample actual horns and while ensuring power conservation for the system.

2. Description of the Related Art

For a number of different product types, the typical method for marketing various models of consumer products is a sound demonstration in a retail store and involves taking a sample of each product and placing or presenting them side-by-side on a shelf or display case. For certain consumer electronics products, to demonstrate to the consumer how the sample actually sounds, this presentation detrimentally requires that the side-by-side samples are each hooked up to a regulated power source able to handle high-current draw and possibly to a power-control network to support the same. The result is that you have an expensive display composed of complicated and extensive cabling that may require junction boxes, networking, switching, and power control. Typically, such power controls, networking junction boxes, and systems to provide power to consumer products having differing voltages and current demands are exceedingly difficult to manage and correspondingly highly expensive and rarely if ever done. As an additional burden, often this type of comprehensive retail display requires differing insurance coverage for the retail owner. As a consequence, where there is a large product selection the retailer owner merely chooses one or two specimens for physical comparison and informally (non-professionally) provides a temporary power supply specific to the product, such as a 12 volt vehicle battery which similarly adopts high-current-related, acid-related (including environmental type dangers), and child-related dangers and associated legal liabilities. A similar detriment is the loss of valuable retail space taken by the battery, power supply; and display; typically 3-5 feet of continuous shelf space. As a result, there are many detriments associated with the previously known attempts at this technology and heretofore they have remained unresolved.

After-market horns (those that are not part of the host vehicle's original equipment) are produced for those consumers who want to add a specific sound, specific model, or specific type of horn to their car, truck, train, motorcycle, RV's, off-road vehicles, emergency vehicles, industrial equipment, or pleasure and industrial water-craft (e.g., boats). Generally, the best way for a consumer to determine if they want to buy a specific product model (horn, siren, back-up alarm) is to sample the actual model, hearing is believing. Unfortunately, retail vehicle parts and accessory suppliers such as Pep Boys™ or AutoZone™, who sell after-market parts such as mirrors, carburetors, and the like, set aside shelf space for samples or boxes of selected products for the store's consumers to evaluate based upon both the profitability of a product or product line (based on past sales) and upon the expense in displaying (higher profit products are displayed, lower profit/rare-order items are not displayed). Items are not displayed due to space and other limitations noted earlier. Ultimately, the retail display space dedicated to certain products is space that is reduced or not dedicated to other products and the competition for limited retail space (e.g., shelf space) is thus fierce among product competitors.

Optimizing the profit of every foot of retail floor space is essential to business survival. Optimizing retail display space is a concern for all retail store operators. The inventor has now originally recognized that reducing a product's footprint on the shelves while still providing the consumer with the ability to make an informed choice about product selection is of distinct competitive advantage.

In the case of after-market horns, the problems associated with footprint become acute. Horns need to be attached to a costly power supply that requires at least one of a costly regulated power supply that can handle sudden high current requirements, or the use of a wet cell battery that requires periodic maintenance and safe storage (potentially hazardous). Some horn suppliers create and install at their own cost elaborate custom switching, routing, or power reduction networks to handle the wiring; and, the wiring has a footprint of its own. Because of their diversity in tone, inherent audible level, power and use, there a great number of potential samples that can be put on display; each sample with its own per unit cost. The potential is expensive, or at best, limiting. There is an additional concern—noise. By their very nature, horns produce a loud audible signal, which in the confines of a retail store can be painful to hear, disruptive to store operations, hazardous to hearing, and may incur medical liability for the retail store in the case of high decibel truck or train horns. If multiple consumers are sampling multiple horns the result can be an extremely noisy, uncomfortable or confusing selection experience.

What is also not appreciated by the prior art is the cost associated with maintaining on a display individual pieces of equipment to be sampled. In the case of car, boat, or other forms of after-market horns, that are placed on display for a consumer to sample, there is the per unit cost of each individual horn to be sampled or selected from, the footprint of the equipment and cabling relative to the shelf or case housing the equipment, the volume of some horns in a relatively closed space, and the power consumption necessary to drive each sample.

Accordingly, there is a need for an improved system that allows a user to select a horn based on listening to one or more audio files associated with a corresponding particular horn sound or horn model. There is also a need for a system that reduces costs, shelf footprint, and noise proliferation by providing a single device that allows a store customer to distinguish from among different horn types without having to sample actual horns or require assistance from store personnel—e.g., self-selection and self-instruction.

ASPECTS AND SUMMARY OF THE INVENTION

An aspect of the present invention is to provide a system that allows a user to select a horn based on listening to one or more audio files accurately associated with a sound produced by a particular horn (or model device), sold in the store or available to the store from their warehouse or supplier or special order program.

Another aspect of the present invention is to provide a system that reduces costs, shelf footprint, and noise proliferation by providing a single device that allows the device user (store customer) to distinguish from among different horn sounds and horn models without having to purchase a horn or model device with an unknown sound. The shelf footprint is similarly reduced by eliminating the large display and cabling associated with integrating a plurality of horns, let alone the horns themselves. And, further eliminates the need for a high-current regulated power supply or a vehicle type (12 volt) battery in a manner noted above as required by the previous technology.

The present invention relates to a method and system for selecting a horn from among a plurality of horns. The invention comprises recording an audio file that is representative of a particular horn. Each audio file is stored in a memory that can be integrated within a single device together with a keypad, a display, a power source, and/or a data port. In the alternative, the audio file can be resident in a remote data processing hub that can download a selected audio file to one or more remote devices.

The device is accessed by the system user through a keypad mounted thereon. A display, such as an LCD or LED type, indicates to the user a set of choices from among the different audio files that can be accessed, and the user makes a choice. In an alternative embodiment, the keypad and display can be integrated in a touch screen; or, still another embodiment, the keypad and display can be housed in separate units.

In one embodiment of the present invention, the display will show a list of possible horn types by a code such as a model or sequence number. The system user selects an audio file from the list by entering a code representative of a select horn type. Entering of a request command to play the selected audio file causes the audio file to be played through one or more audio speakers. The audio speakers can be built into the same device housing the keypad or display, or can be housed in a separate unit.

The system can also be linked to a printer that can print a receipt or a ticket corresponding to the selected horn type. The receipt can be brought to a store checkout for payment; or, the ticket can be brought to a customer service desk so that the corresponding horn can be delivered from inventory to the customer.

In a particular embodiment of the present invention the device can comprise volume adjustment means for selecting from among a plurality of volume levels for playback through the one or more speakers. Alternatively, the volume adjustment means can be mounted in a separate device or in a standalone mode.

Power to the system, particularly if embodied in a single device, can be supplied by battery, AC, or by providing a choice of either. A time-out power-saving circuit feature allows for reducing power consumption by the system when the system has not been used for a pre-defined period of time.

As one aspect of the present invention is to reduce footprint by eliminating cabling and the mounting of individual horns, the aspect is furthered by making the invention accessible and convenient to the system user (essentially a consumer trying to determine which type of horn to buy). This aspect is achieved by providing a mounting bracket for the integrated device. The device is mounted on the bracket; and, in turn the bracket is mounted to a shelf or wall at an accessible height.

The device can be slidably, lockably, and rotatably mounted so that the device can be pivoted or tilted to achieve ease of access.

In another embodiment of the present invention, there is provided a system for selecting a horn, from among a plurality of horns. The system comprises a recording and storing means for recording a plurality of audio files, and wherein each of the audio files corresponds to a select horn type. The audio files are stored in a memory of the system.

The system has a keyboard or keypad, mounted in a base unit, for accessing the memory so as to select an audio file from the plurality of stored audio files. The system has a stand for supporting the base unit; and, a set of one or more speakers, integral to the base unit, for listening to a selected audio file.

The system further comprises a battery compartment for housing one or more batteries for powering said system. Additionally, the system has a time-out power-saving feature for reducing power consumption by the system when it has not been used for a pre-defined period of time.

The stand of the system further comprises a top portion for mating with the bottom portion of the base unit, an extension portion connected to the top portion, a sleeve portion for allowing the extender portion to move up or down relative to the sleeve portion, and a base portion for supporting the sleeve portion.

The system's top portion further comprises a pad for physical contact with the base unit and further for securing the top portion to the base unit. The top portion has a neck extending from the pad to a ball of a ball joint, the ball joint for allowing the top portion to be capable of being rotated in relation to the extender portion. There is also a ball joint base for securing the top portion to the extender portion.

The extender portion further comprises securing means for securing the extender portion to the top portion. There is a channel cut into the length of the extender portion. The channel has a plurality of stops, where each of the stops is for stopping the extender portion from moving up or down relative to the sleeve portion. There are also engaging means for engaging a selected one of the stops to allow the extender portion to be stopped in a selected position. The channel of the extender portion has a final stop beyond which the extender portion is blocked from leaving the sleeve portion.

The sleeve portion further comprises a hollow body with an open top end and a closed bottom end for allowing the extender portion to move up or down within the hollow body and to extend through the open top end. There is also a housing for supporting the engaging means, and a bottom portion. The bottom end of the sleeve portion is secured to the base portion in such a manner as to allow the sleeve portion to rotate forward or backward relative to the base portion.

The base portion further comprises connecting means for connecting the base portion to the sleeve portion, and fastening means for fastening the base portion to a retainer such as a pegboard, a wall, or a rail mount.

The fastening means further includes a set of one or more posts (such as screws or bolts), which extend downward from the base portion so as to pass through the surface of the retainer. Locking means are provided for locking the posts through the use of a nut or a clip, in such a way as to fasten the base portion to the retainer.

The fastening means also includes a channel running from one side of the base portion to the opposite side of the base portion. The channel is for placing on a rail mount. A base plate is positioned on the opposite side of the rail mount from the channel; and, the set of one or more posts are capable of straddling the rail mount and extending past it to securely engage with the base plate.

The system, whether embodied in a single device, in separate stand-alone devices, or as part of a system having a remote hub, can include a USB port for receiving of updated programs or digital data to supplement or complement software routines within the system. The software routines are for tracking system preferences such as horn model selection data and audio volume selection preferences. If the system is part of a greater data processing network, then that particular embodiment of the present invention contemplates a data processing hub; memory means, located at the data processing hub, for storing software routines; and, compiling means for compiling system data from one or more systems.

The above, and other aspects, features and advantages of the present invention, will become apparent from the following description read in conduction with the accompanying drawings, in which like reference numerals designate the same elements.

BRIEF DESCRIPTION OF THE DRAWINGS

FIG. 4 is a flowchart of the method of the present invention.

DETAILED DESCRIPTION OF THE PREFERRED EMBODIMENTS

Figure 1:
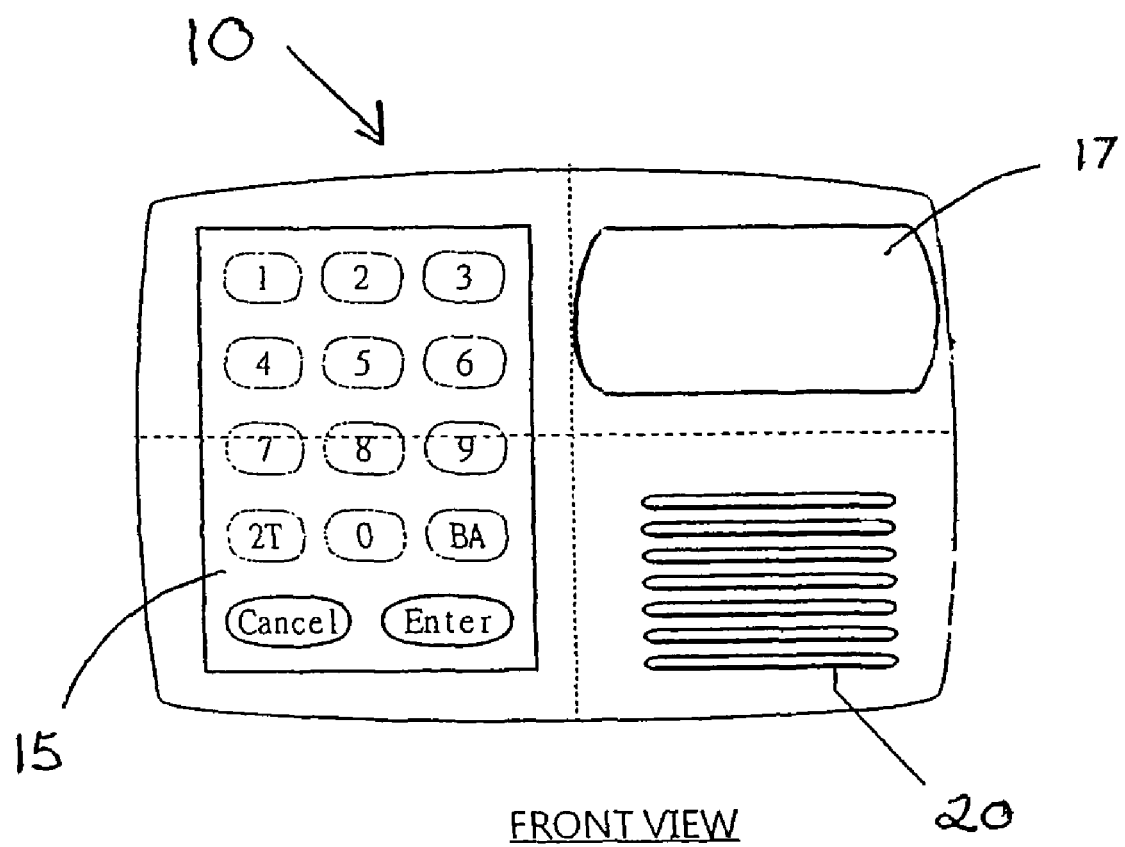
FIG. 1 is a pictorial representation of the front surface of a device capable of embodying the present invention in a fully integrated embodiment.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

The invention comprises recording an audio file that is representative of a particular device (e.g., horn, siren, or other device). Each audio file is stored in a memory that can be integrated within a single device together with a keypad, a display, a power source, and/or a data port. In the alternative, the audio file can be resident in a remote data processing hub that can download a selected audio file to one or more remote devices.

Turning to FIG. 1, there is shown a front view of a device 10 that is capable of embodying the subject invention. The device 10 is accessed by the system user through a keypad 15 mounted thereon. A display 17, such as an LCD or LED type, indicates to the user a set of choices from among the different audio files that can be accessed, and the user makes a choice. In an alternative embodiment, the keypad and display can be integrated in a touch screen; or, still another embodiment, the keypad and display can be housed in separate units.

In one embodiment of the present invention, the display 17 will show a list of possible horn types by a code such as a model or sequence number. The system user selects an audio file from the list by entering a code representative of a select horn type. Entering of a request command to play the selected audio file causes the audio file to be played through one or more audio speakers 20. The audio speakers 20 can be built into the same device housing the keypad 15 or display 17, or can be housed in a separate unit such as in a headset or ear buds.

Figure 3:
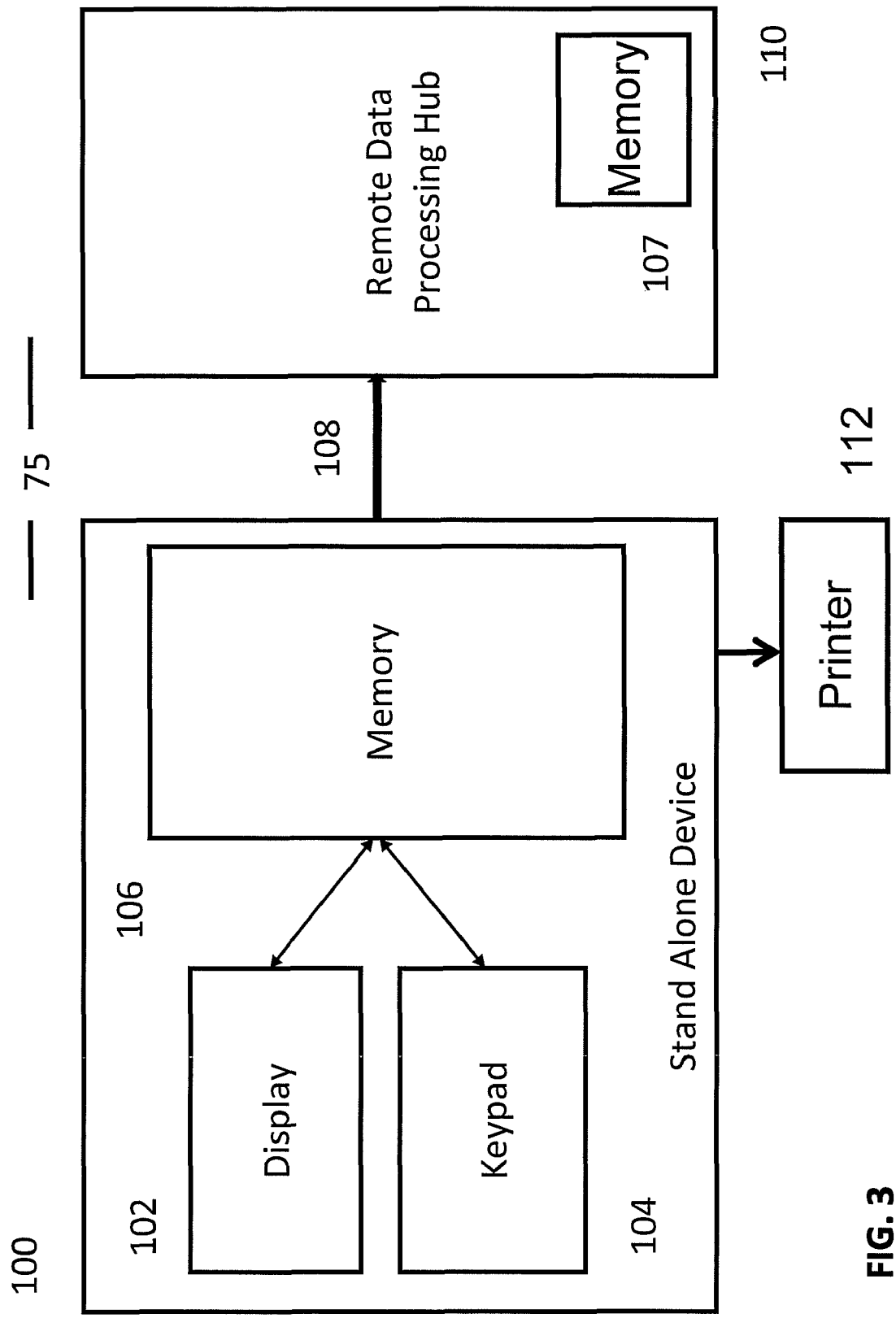
FIG. 3 is a block diagram of the device of the present invention showing the interface with a printer.

The system can also be linked to a printer 112 (as is shown in FIG. 3) that can print a receipt or a ticket corresponding to the selected horn type. The receipt can be brought to a store checkout for payment; or, the ticket can be brought to a customer service desk so that the corresponding horn can be delivered from inventory to the customer.

Figure 2:
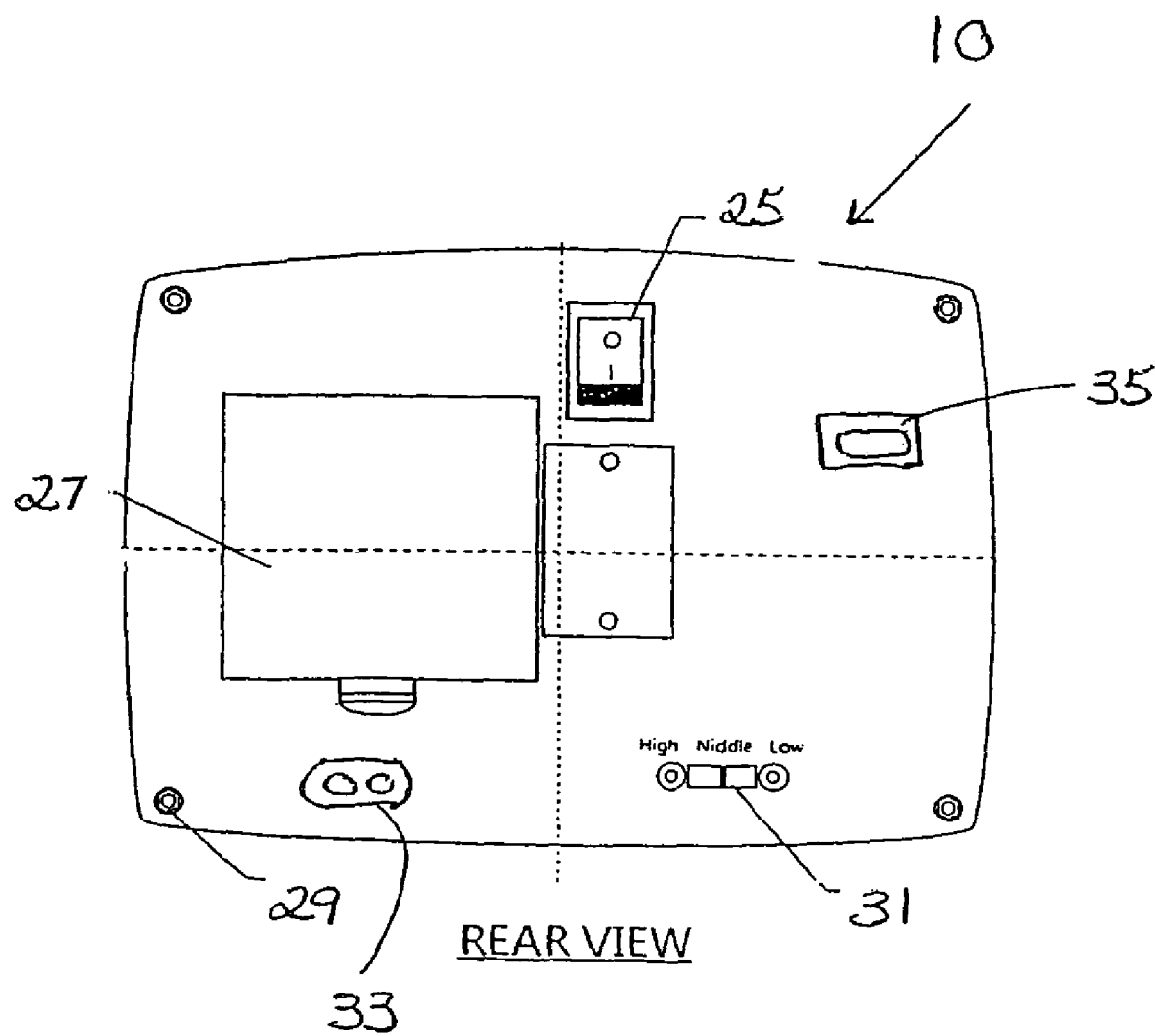
FIG. 2 a pictorial representation of the back surface of a device capable of embodying the present invention in a fully integrated embodiment.

Turning to FIG. 2, there is shown a rear or back view of the device 10 that is capable of embodying the subject invention. In a particular embodiment of the present invention, the device can comprise volume adjustment means such as switch 31 for selecting from among a plurality of volume levels for playback through the one or more speakers 20. Alternatively, the volume adjustment means can be mounted in a separate device or in a standalone mode.

Power to the system, particularly if embodied in a single device, can be supplied by battery 27 in a 9 volt DC format, AC which can be accessed through female plug 33, or by providing a choice of either. Switch 25 powers the electronic circuit on or off.

As one aspect of the present invention is to reduce footprint by eliminating a large display unit and cabling and the mounting of individual horns, the aspect is furthered by making the invention accessible and convenient to the system user (essentially a consumer trying to determine which type of horn to buy). This aspect is achieved by providing a universal-type mounting bracket for the integrated device to allow adaptive mounting to a variety of shelving/unit mounting fixture systems. The device is mounted on the bracket; and, in turn the bracket is mounted to a shelf or wall at an accessible height. The device can be slidably, lockably, and rotatably mounted so that the device can be pivoted or tilted or slid to achieve ease of user-access and to be secured to prevent theft.

The system, whether embodied in a single device, in separate stand-alone devices, or as part of a system having a remote hub, can include a USB or other type of port 35 for receiving of updated programs or digital data to supplement or complement software routines within the system. The software routines are for tracking system preferences such as horn model selection data and audio volume selection preferences.

Turning to FIG. 3, there is shown a block diagram of a stand alone device 100 of the present invention containing a display 102, keypad 104 with operational memory circuit 106 now also shows an interface with a printer 112. If the system is part of a greater data processing network 75, then that particular embodiment of the present invention contemplates a data processing hub 110 interoperatively inked via linking means 108 which may be hardwired or wireless; memory means 106, located at the device 100 and memory means 107 in data processing hub 110, for storing software routines; and, compiling means for compiling system data from one or more systems.

An additional aspect of the present invention is the ability to support long shelf display life through creation of an auto-shut off and power management circuit in device 100. While the functional aspects of the present invention can be arranged according to circuitry engineering requirements, a particular aspect is that the specific circuit in device 100 allows for power conservation in at least two ways. First, power conservation is achieved by including in the control circuit a time-out function whereby after a period of non-use via keypad 15 or other aspect (for example 15 seconds), device 100 enters a sleep shut-down mode that draws no power. Additionally, device 100 will not awake from the shut-down mode until keyed by a keypad 15 contact which also serves as a wake-up instruction to the control pad and device 100. The time-out function may be adjusted by the manufacturer or by the display operator for power conservation. As a result, the circuit in device 100 operates only in a periodic power-draw manner (on/off) so that batter life can be greatly extended from a typical constant-operation life of likely months to a periodic-operation life of at least one year or more.

Turning to FIG. 4, there is shown a flowchart of the method of the present invention. The method is initiated at step 200 when the process of recording an individual audio file begins. The method advances to step 202 when an audio file corresponding to a particular horn is recorded. The recorded audio file is stored at step 204 in a memory of the system, either locally or remotely.

Once a set of one or more audio files has been stored, a system user (store customer) can access the files by selecting from among the potential choices displayed in the display at step 206 and/or visually present application charts or product model number identifiers. The system user makes the selection at step 208 and the selected audio file is played over speakers at step 210 for the benefit of the system user. From step 210, the method advances to the query at step 212 which asks if the user wants to select another audio file. If the response to the query is "YES", than the method returns to step 208 where another audio file can be selected from among the choices displayed to the user. However, if the response to the query at step 212 is "NO" (via a period of non-responsiveness of further input to keypad 104 and the automatic time-out function), then the method advances to step 214 to terminate the sequence and enter the above-discussed shut-down mode (terminate sequence 214) for no power draw.

Figure 5A:
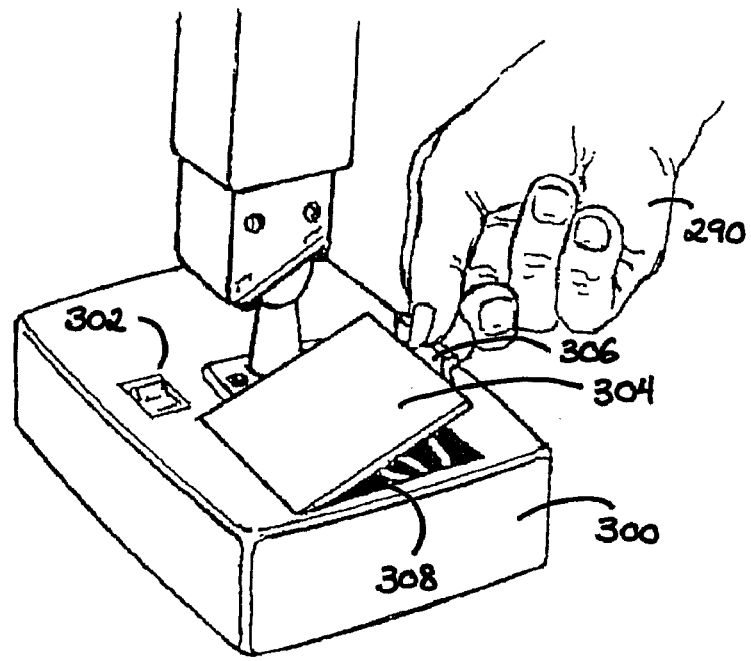
FIGS. 5A and 5B are a pictorial representation of the method for installation of the battery in the system of the present invention.
Figure 5B:
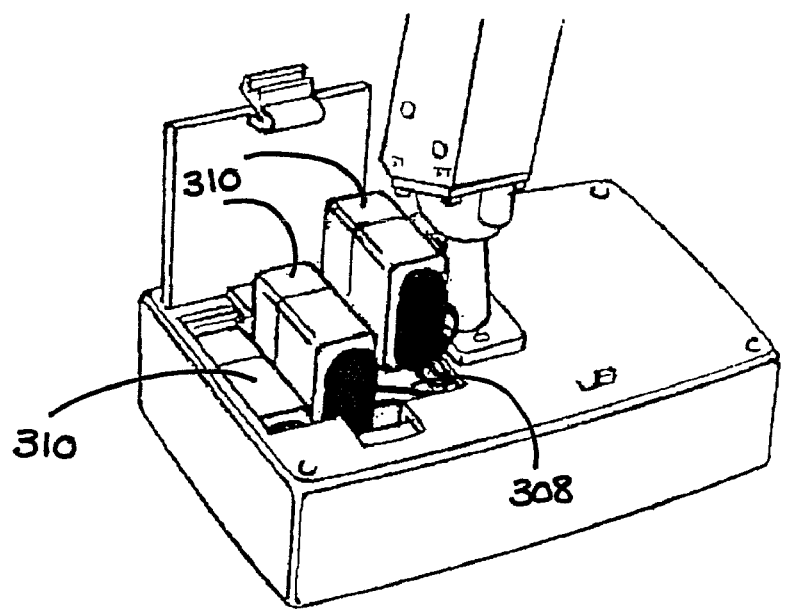

Turning next to FIGS. 5A and 5B there is shown a pictorial representation of the method for installation of the batteries in the system of the present invention. In FIG. 5A, there is shown base unit 300 having on/off switch 302. The system user 290 opens the lid 304 to the battery compartment 308 by pressing downward on latch 306. Continuing to FIG. 5B, there is shown three (3) 9-volt batteries 310 being placed into the open battery compartment 308.

Figure 6A:
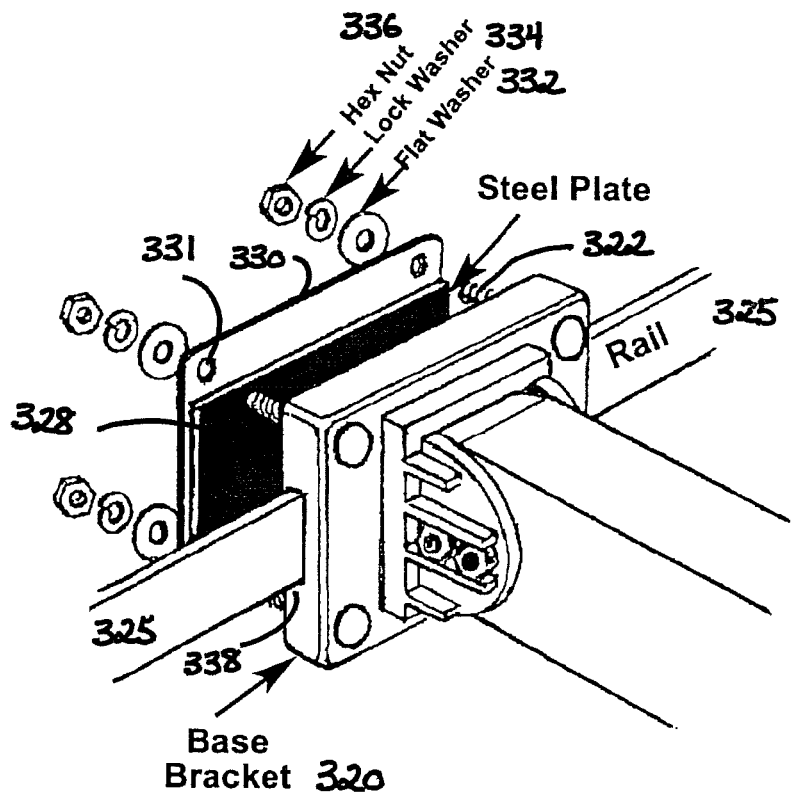
FIGS. 6A and 6B are a pictorial representation of the method of mounting an embodiment of the present invention to a rail system.
Figure 6B:
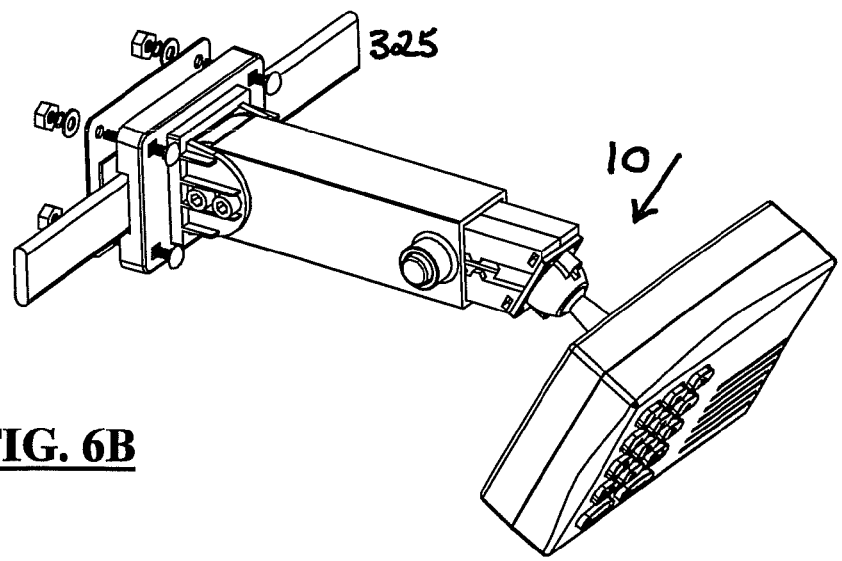

In FIGS. 6A and 6B, there is shown a pictorial representation of the method of mounting an embodiment of the present invention to a rail system 325. In FIG. 6A, the rectangular (representative in shape only) base portion 320 is placed over the rail 325 so that the rail meets the channel 338 of the base portion 320. Screws 322 extend past the rail to engage with the base plate 330 by passing through corresponding holes 331. The screws are secured by locking them in place with corresponding flat washer 332, lock washer 334, and hex not 336. Non-slip rubber facing 328 is positioned on the base plate 330 so as to assist in securing the mounting of the base portion 320 to the rail 325. FIG. 6B is a more extended view of the pictorial representation as shown in FIG. 6A wherein the device 10 is shown in its entirety.

Figure 7A:
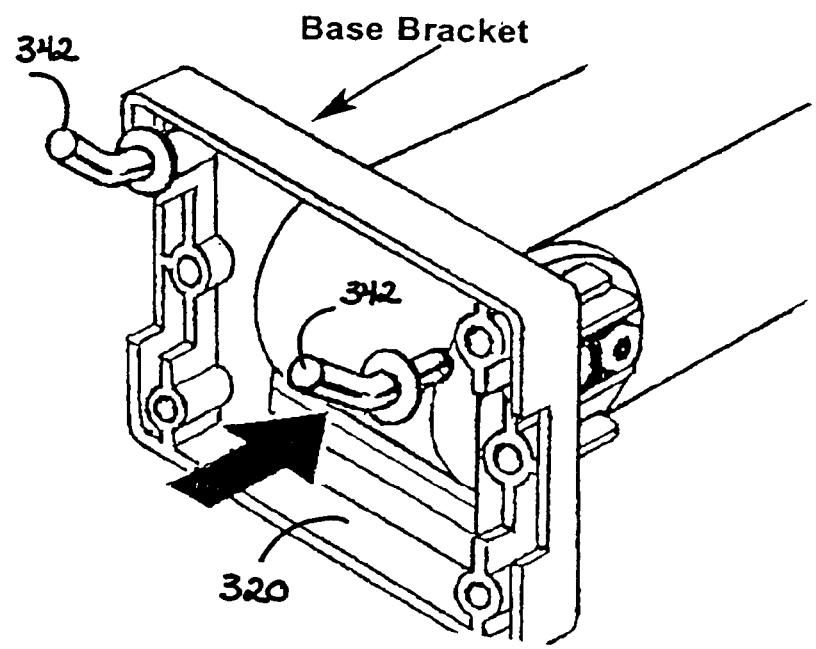
FIGS. 7A and 7B are a pictorial representation of the method for mounting an embodiment of the present invention to a pegboard system.
Figure 7B:
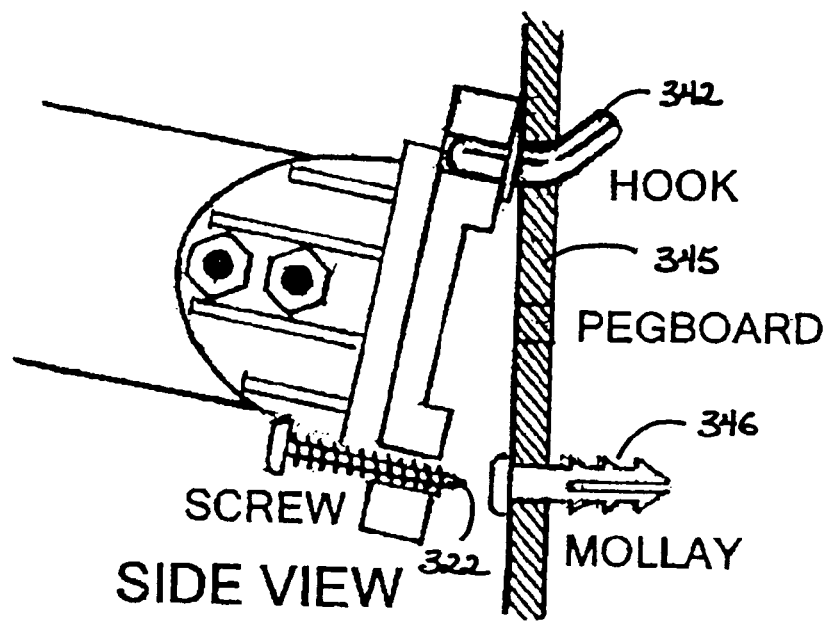

Turning next to FIGS. 7A and 7B there is shown a pictorial representation of the method for mounting an embodiment of the present invention to a pegboard system. In FIG. 7A, the underside of base unit 320 is shown where instead of using only screws 322 to fasten the base unit, two short rod hooks 342 are used to engage with the mounting holes 349 of a pegboard 345 as is shown in FIG. 7B. The base is then locked in place by using two screws 322 engaging a corresponding mollay 346 which is positioned in a corresponding hole of the pegboard 345.

Figure 7C:
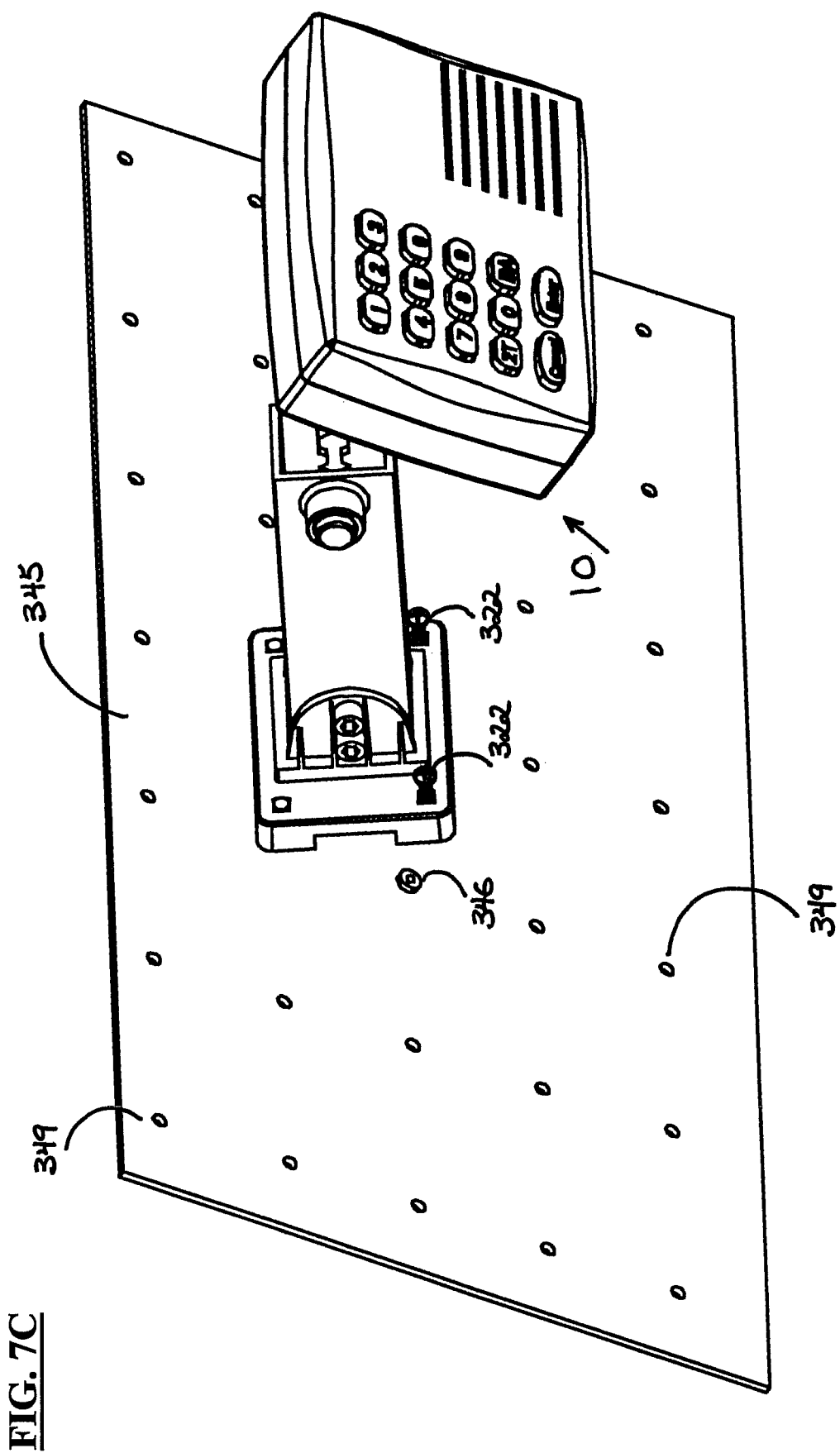
FIG. 7C is a pictorial representation of a mounting on a pegboard of an embodiment of the present invention.

FIG. 7C is a pictorial representation of a mounting on a pegboard of an embodiment of the present invention. The device 10 is placed on the pegboard 345 such that the short rod hooks 342 each engage a corresponding mounting hole 349 of the pegboard 345 and are then locked in place as the screws 322 are positioned over a mollay 346 mounted in a corresponding mounting hole 349 of the pegboard 345.

Figure 8A:
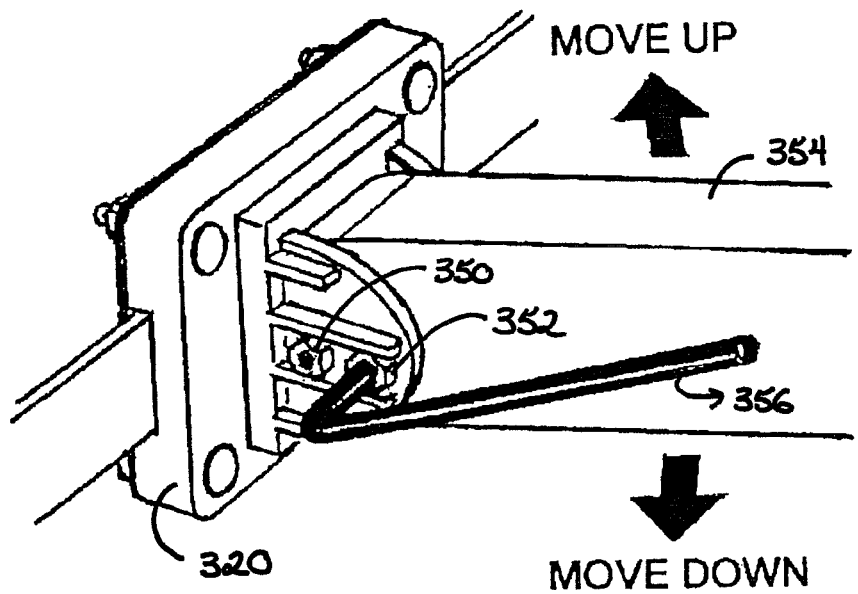
FIGS. 8A and 8B are a pictorial representation of the method for adjusting the sleeve portion of the system relative to the base portion.
Figure 8B:
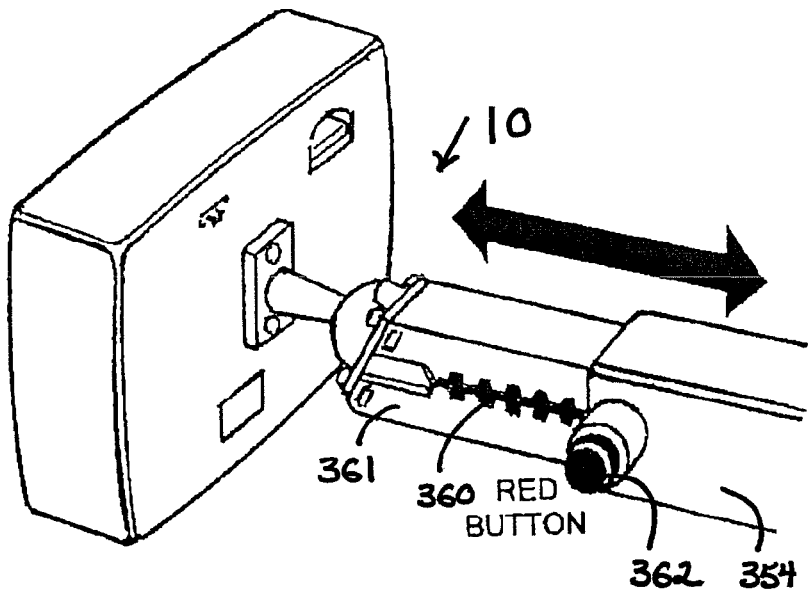

Turning then to FIGS. 8A and 8B, the system for adjusting the height of the sleeve portion 354 relative to the base portion 320 is shown.

FIG. 8A is a pictorial representation of the method for adjusting the sleeve portion 354 of the system relative to the base portion 320. An alien wrench 356 can be utilized to adjust set screw 352 to control the height of the sleeve 354. Additionally, the tightness of the rotational movement of the sleeve 354 relative to the base portion 320 can be changed by adjusting set screw 350. The invention contemplates that the utility of set screws 352 and 254 could be reversed for design purposes.

FIG. 8B is a pictorial representation of the method for adjusting the movement of the extender portion 361 of the device 10, which can be adjusted by depressing the locking button 362 to stop the movement of the extender portion 361 as it slides in and out of the sleeve 354. Depressing the button 362 activates a spring which forces a detent (not shown) to engage one of the stops in the channel 360.

Figure 9:
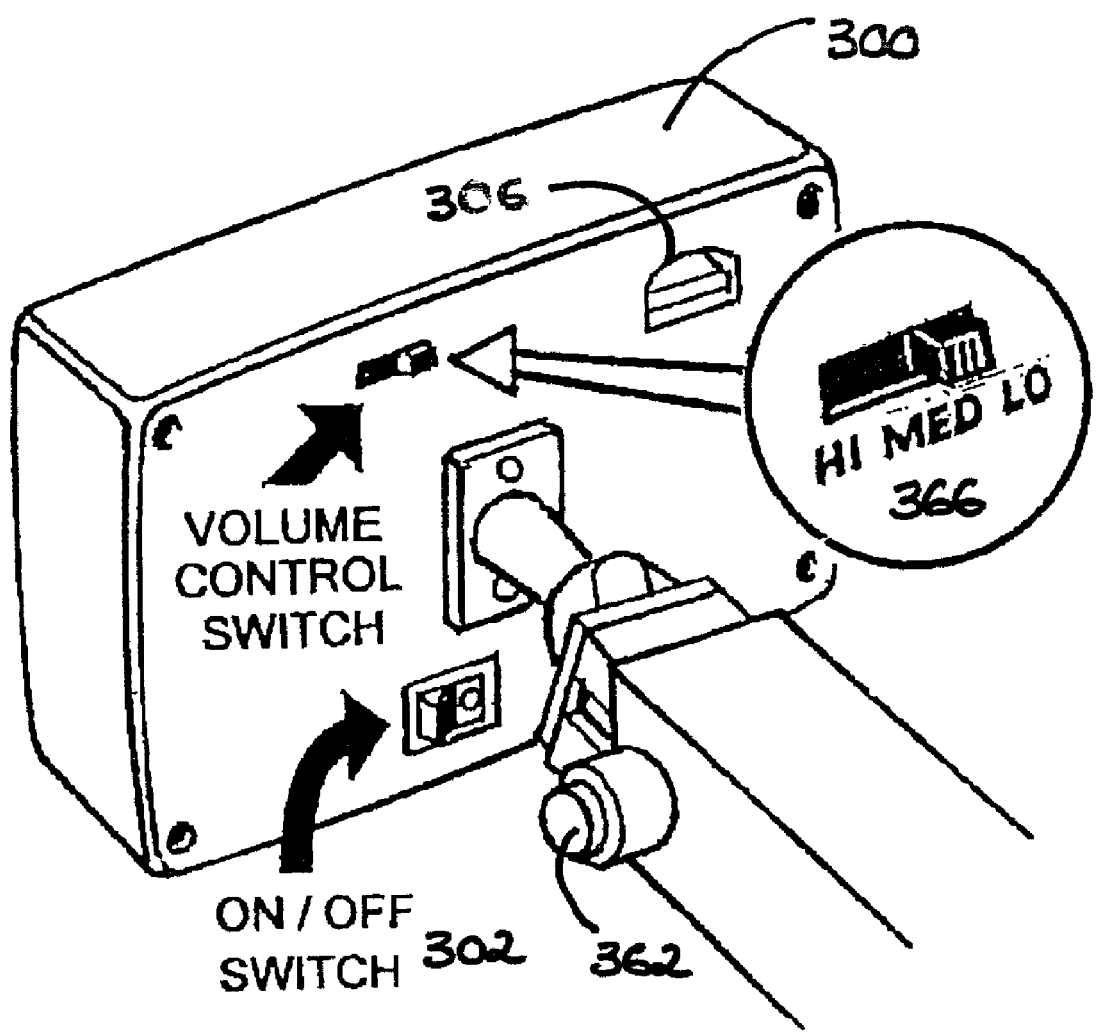
FIG. 9 is a pictorial representation of the volume selection control as integral to the base unit.

Turning to FIG. 9, there is shown a pictorial representation of the volume selection control 366 as integral to the base unit 300. Also depicted are on/off switch 302, locking button 362, and battery compartment latch 306.

As used herein, the word "horn" shall be understood as not limited to horns per se, but additionally will include sirens, warn enunciators, back-up alarms, audio signaling devices, emergency signalers, being hand-held or otherwise, and related devices. As a result, the phrase horn will be understood to be not limited to the phrase 'horn' but shall be viewed inclusively.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A system for selecting a horn, from among a plurality of horns, said system comprising:
    (a) recording and storing means for recording a plurality of audio files, wherein each of said audio files corresponds to a select horn type, and storing said plurality of audio files in a memory device;
    (b) a keyboard or keypad mounted in a base unit, for accessing said memory device;
    (c) a stand for supporting said keyboard or keypad in said base unit;
    (d) selection means for selecting a select audio file from said plurality of stored audio files; each said stored audio files being an accurate pitch representative of a selected horn and
    (e) a set of one or more speakers for listening to said selected audio file; said speakers being integral to said base unit, whereby said audio file is operably matched to said set of one or more speakers to achieve said accurate pitch of said selected horn;
    (f) a printer for printing a selection ticket or receipt based on the horn selected by a system user; and said selection ticket or receipt including of a horn model selection and at least one of an audio volume selection preference, a horn sequence number, and a system location data;
    (g) a display for viewing a set of selection criteria;
    (h) wherein said display comprises a touch screen for making a selection from among said set of selection criteria and said selection criteria comprises a list of one or more horn model numbers wherein each of said model numbers corresponds to respectively said audio files within said plurality of stored audio files;
    (i) volume adjustment means for selecting from among a plurality of volume levels for playback through said set of one or more speakers;
    (j) said keyboard or said keypad, and said display are integrated into a single device;
    (k) said single device being rotatably mounted on a pivoting bracket for ease of use by a system user;
    (l) a USB port for receiving of updated programs or digital data;
    (m) said system further comprising one or more software routines wherein said one or more software routines are for tracking system preferences such as said horn model selection data and said audio volume selection preferences;
    (n) said system is interoperably connected to a network, said network further comprising:
        i. a data processing hub;
        ii. memory means, located at said data processing hub, for storing software routines; and
        iii. compiling means for compiling data from said system
        iv. said compiling data to include said tracking system preferences;
    (o) said system and said one or more software routines operable for operably engaging said printer via one of said keyboard or keypad and said network, for printing said tracking system preferences including a frequency of said horn model selection data said audio volume selection preferences over a user selected time,
    (p) said stand further comprising:
        i. a base portion, said base portion further comprising fastening means for fastening said base portion to a retainer;
        ii. a to portion for mating with the bottom portion of said base unit;
        iii. an extension portion connected to said to portion;
        iv. a sleeve portion for allowing said extension portion to move up or down relative to said sleeve portion;
    (q) said fastening means further comprises:
        i. a channel running from one side of said base portion to the opposite side of said base portion; said channel for placing on a rail mount;
        ii. a base plate for positioning on the opposite side of said rail mount from said channel; and
        iii. a set of one or more posts, said one or more posts extending downward from said base portion, said one or more posts capable of straddling said rail mount and extending past said rail mount to securely engage with said base plate; and
    (r) said system further comprising a time-out power-saving feature for reducing power consumption by said system when said system has not been used for a pre-defined period of time.

2. The system of claim 1, wherein said system is powered by a power source selected from the group comprising:
    (a) Battery; and
    (b) an AC power source.

3. The system of claim 1, wherein said audio speakers are headphones interoperably connected to said system.

4. The system of claim 1, wherein said retainer is selected from the group comprising:
    (a) a pegboard;
    (b) a wall; and
    (c) a rail mount.

5. The system of claim 1, wherein said top portion further comprises:
    (a) a pad for physical contact with said base unit and further for securing said top portion to said base unit;
    (b) a neck extending from said pad to a ball of a ball joint, said ball joint for allowing said top portion to be capable of being rotated in relation to said extender portion;
    (c) a ball joint base for securing said top portion to said extender portion.

6. The system of claim 1, wherein said sleeve portion further comprises:
    (a) a hollow body with an open top end and a closed bottom end for allowing said extender portion to move up or down within said hollow body and to extend through said open top end;
    (b) a housing for supporting said engaging means; and
    (b) a bottom portion.

7. The system of claim 1, wherein said bottom end of said sleeve portion is secured to said base portion in such a manner as to allow said sleeve portion to rotate forward or backward relative to said base portion.

* * * * *